United States Patent

Matsushita

[19]

[11] Patent Number: 5,850,545
[45] Date of Patent: Dec. 15, 1998

[54] APPLICATION PROGRAM ENVIRONMENT SETTING SYSTEM AND METHOD

[75] Inventor: Masahiro Matsushita, Kanagawa-Ken, Japan

[73] Assignee: Fuji Photo Film Co., Ltd., Kanagawa-ken, Japan

[21] Appl. No.: 398,090

[22] Filed: Mar. 3, 1995

[30] Foreign Application Priority Data

Apr. 15, 1994 [JP] Japan .................................. 6-077522

[51] Int. Cl.[6] .................................................. G06F 9/45
[52] U.S. Cl. .................................................. 395/651
[58] Field of Search .................................. 395/700, 600, 395/500, 650, 155, 157, 159, 160, 651, 653

[56] References Cited

U.S. PATENT DOCUMENTS

| | | | |
|---|---|---|---|
| 4,179,735 | 12/1979 | Lodi | 395/700 |
| 4,586,158 | 4/1986 | Brandle | 395/155 |
| 4,590,557 | 5/1986 | Lillie | 395/700 |
| 4,635,189 | 1/1987 | Kendall | 395/690 |
| 5,025,395 | 6/1991 | Nose et al. | 364/518 |
| 5,036,484 | 7/1991 | McCoy et al. | 395/500 |
| 5,065,347 | 11/1991 | Pajak et al. | 395/159 |
| 5,115,504 | 5/1992 | Belove et al. | 395/600 |
| 5,179,700 | 1/1993 | Aihara et al. | 395/650 |
| 5,230,072 | 7/1993 | Smith et al. | 395/600 |
| 5,276,877 | 1/1994 | Friedrich et al. | 395/650 |
| 5,327,560 | 7/1994 | Hirata et al. | 395/700 |
| 5,355,497 | 10/1994 | Cohen-Levy | 395/700 |
| 5,423,034 | 6/1995 | Cohen-Levy et al. | 395/600 |
| 5,428,785 | 6/1995 | Morel et al. | 395/700 |
| 5,430,878 | 7/1995 | Straub et al. | 395/700 |

*Primary Examiner*—James P. Trammell
*Assistant Examiner*—Peter J. Corcoran, III
*Attorney, Agent, or Firm*—Sughrue, Mion, Zinn, Macpeak & Seas, PLLC

[57] ABSTRACT

An environment setting system for multiple users includes a directory management section adapted to be executed by a predetermined command on an operating system and for generating a parameter directory used for storing parameters which determine the environment of the application program utilized by the user or designating the parameter directory, and a parameter management section for, in accordance with the operation of the application program, fetching a predetermined parameter from the parameter directory, transferring the predetermined parameter to the application program and storing the predetermined parameter in the parameter directory. According to the thus constituted environment setting system, users can set their own environments for the application program, by themselves without the help from a system administrator, and can use the application program under the thus set environments.

19 Claims, 3 Drawing Sheets

APPLICATION PROGRAM ENVIRONMENT SETTING SYSTEM AND METHOD

FIELD OF THE INVENTION

The present invention relates to an environment setting system for setting the environment of an application program operating on an operating system, and, particularly, to an environment setting system for setting the environment of an application program which is intend to be used by a plurality of users.

DESCRIPTION OF PRIOR ART

Today's computers are installed with an operating system for more efficiently handling jobs. The operating system controls the computer hardware, and manages resources and/or data needed to execute the application program and/or data.

When multiple users utilize an application program on the operating system, each may need to set the environment to his or her own needs, namely, to customize the environment. For example, after one user has customized the environment of an application program on an operating system intended for use by a single user, such as MS-DOS (registered trademark), the other users must either utilize the application program under the same environment or customize the environment again for their own use. Accordingly, when multiple users utilize the application program on an operating system of this kind, each user has to customize the environment of the application program whenever he or she uses the application program.

On the other hand, on a multi-user operating system designed for use by a plurality of users, such as UNIX (registered trademark), it is possible for each user to utilize the application program under an environment that he or she has customized. However, in order to use the application program in this manner, the following operations are required.

(1) Logging into the system as a system administrator.
(2) Editing a user management file including passwords, groups and the like to register each user.
(3) Making a home directory for each user.
(4) Generating a parameter file for storing parameters for determining the environment of the application program in the above home directory for each user.
(5) Modifying predetermined data in the parameter file created in the home directory to change security parameters such as owner, group, read-write attributes and the like.

Moreover, each user is assigned a password.

Complicated procedures are therefore required for enabling multiple users to utilize a single application program on such a multi-user operating system under their respective environments. In particular, detailed knowledge of the operation system is required to edit the user management file. Accordingly, a system administrator, such as a system engineer, normally edits the user management file in line with the requirements of the individual users and it is difficult for a user who merely utilizes the program to set his or her own environment.

SUMMARY OF THE INVENTION

It is therefore an object of the present invention to provide an environment setting system in which users can themselves set their own application program environments without the help from a system administrator, and can use the application program under the thus set environments.

The above and other objects of the present invention can be accomplished by an environment setting system for multiple users comprising directory management means adapted to be executed by a predetermined command on an operating system for creating a parameter directory used for storing parameters which determine an environment of an application program utilized by a user or designating the parameter directory, and parameter management means for, in accordance with an operation of the application program, fetching a predetermined parameter present in the parameter directory, transferring the predetermined parameter to the application program and storing the predetermined parameter in the parameter directory.

In a preferred aspect of the present invention, the directory management means is adapted to create a parameter file included in the parameter directory, after the creation of the parameter directory, the parameter management means is adapted to store the predetermined parameter in the parameter file.

In a further preferred aspect of the invention, the parameter directory is constituted as a part of a structure having a plurality of hierarchies on the operating system.

In a further preferred aspect of the invention, the parameter file is created only in the parameter directory in the lowest level of the hierarchical structure.

In a further preferred aspect of the invention, the parameter management means is constituted so that as predetermined parameters are modified, during the use of the application program, the parameter management means stores the modified parameters in the parameter directory.

The above and other objects and features of the present invention will become apparent from the following description made with reference to the accompanying drawings.

DESCRIPTION OF PREFERRED EMBODIMENT

Figure 1:
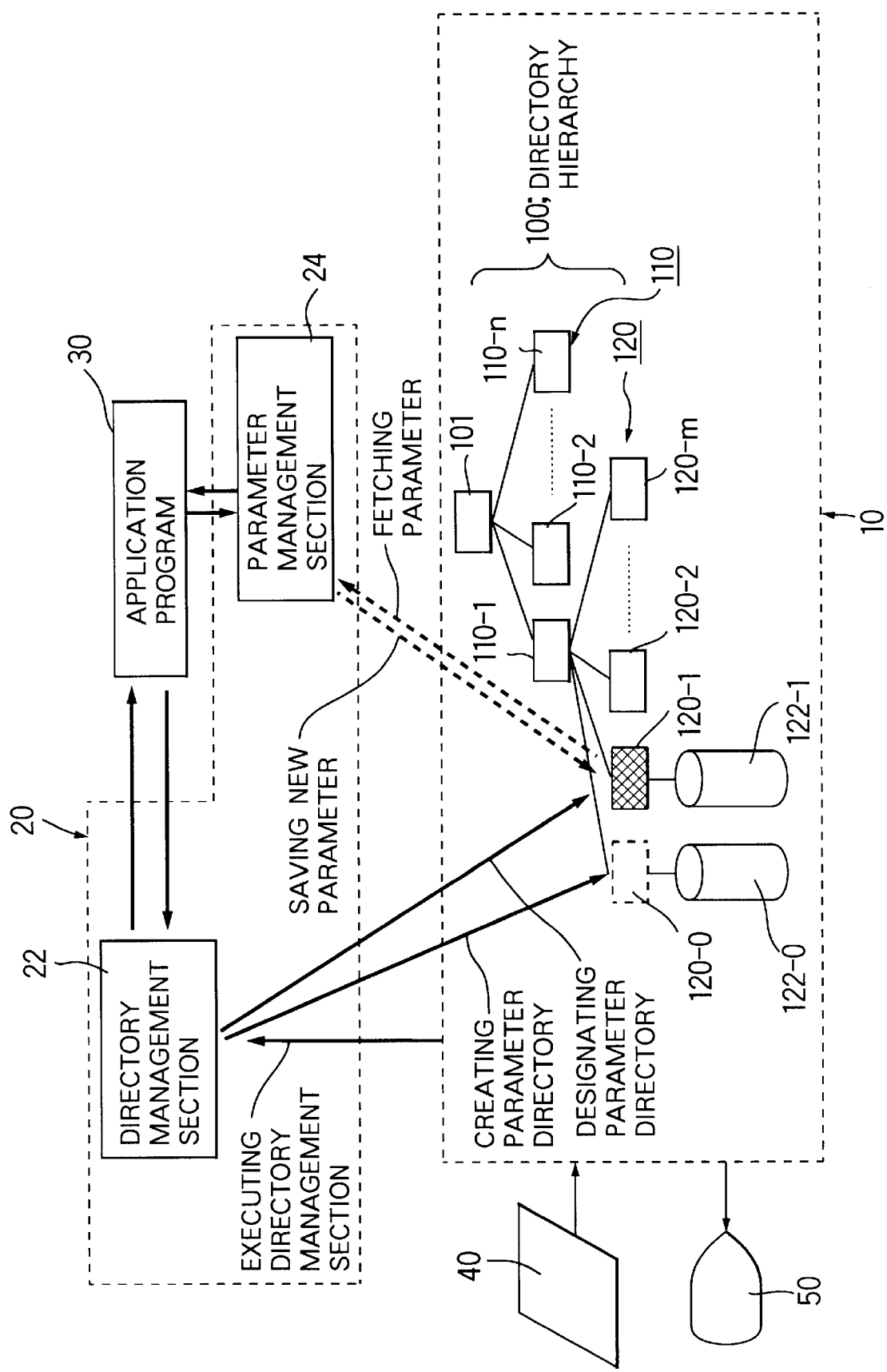
FIG. 1 is a functional block diagram of a computer system installed with an environment setting system which is an embodiment of the present invention.

As shown in FIG. 1, a computer system installed with an environment setting system which is an embodiment of the present invention comprises an operating system 10 for controlling the central processing unit (not shown) and other hardware needed to operate the computer and for managing the resources (not shown) and/or data required to execute application programs and the like, an environment setting system 20 for setting environments for an application program to be utilized by multiple users and managing the set environments, an application program 30 to be utilized by the users, an input device 40 including a keyboard, a pointing device and the like, and a display device 50 including a CRT or the like. In this embodiment, the operating system 10 includes a window system. Further, in this embodiment, the multi-user operating system UNIX (registered trademark) is used as the operating system 10.

The environment setting system 20 comprises a directory management section 22 for creating parameter directories required to set the environments of the application program 30 utilized by users and for designating the parameter directories, and a parameter management section 24 for setting the environments of the application program 30 and managing the set environments.

In the known manner, the environment of the application program 30 includes, for example, the format in which a file list of a plurality of files used in the application program 30 is displayed, a read-write attributes, the gray level of image data to be displayed on the display device 50 as an image when the application program 30 is used, and the like. The application program 30 includes a predetermined file (not shown) which in advance stores default values for environment parameters based on the environments.

The operation of the thus constituted computer system is explained as follows.

First, the user inputs a predetermined command to execute the directory management section 22. As mentioned above, this embodiment uses UNIX (registered trademark) as the operating system 10. Thus, the operating system 10 is preset such that the directory management section 22 of the environment setting system 20 can be executed by logging in with the name of a UNIX log-in for executing the application program.

The environment setting system 20 in this embodiment can operate in two modes, namely, an environment creation mode in which the users newly create their own environments for the application program 30 and a designating mode in which the users operate the application program 30 under their own environments.

The environment creating mode will be explained first.

Figure 2:
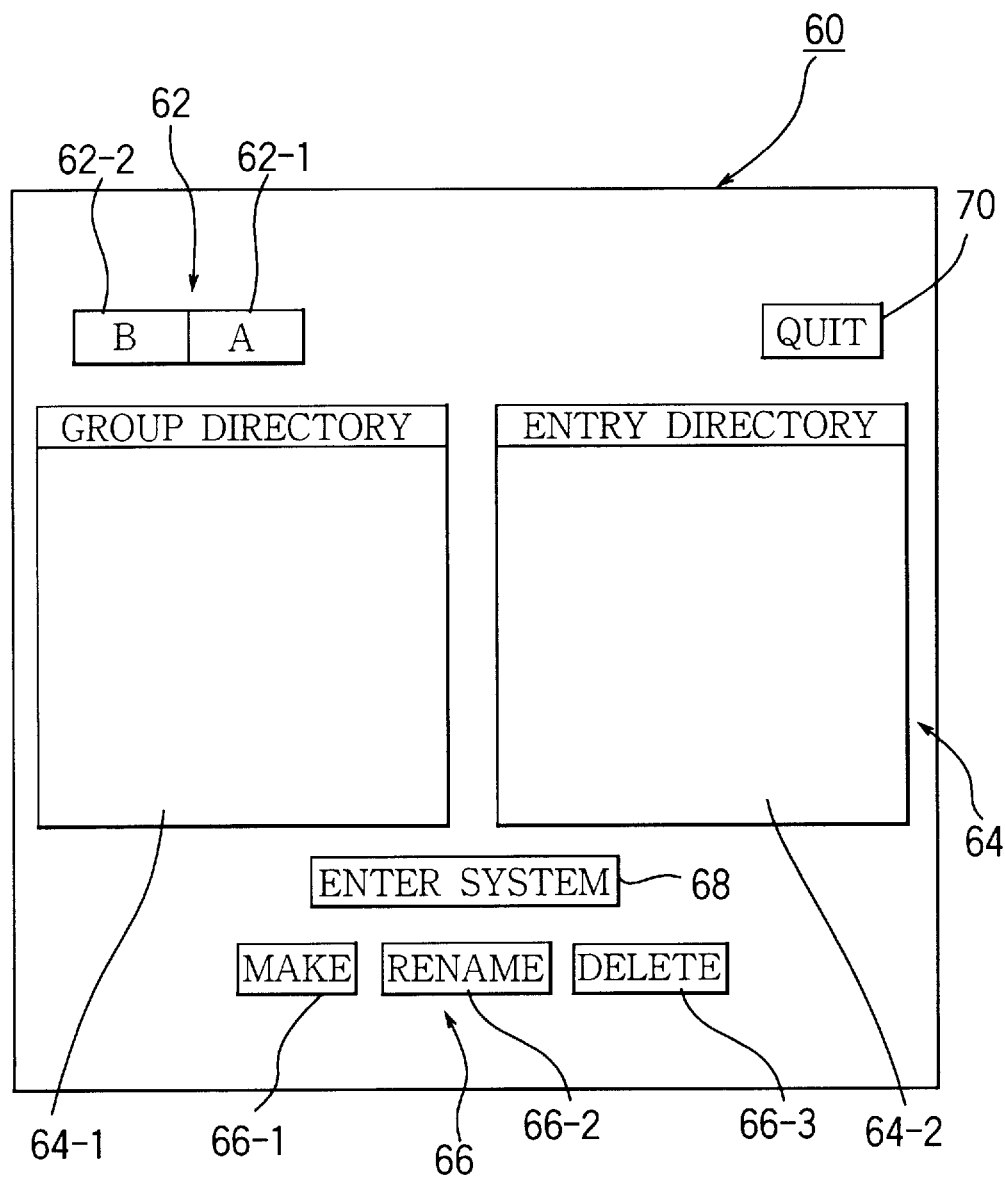
FIG. 2 is a view showing an image displayed on a display section of a display device.

If the user has not yet set his or her own environment for the application program 30, he or she refers to the display device 50 and designates the environment creation mode using the input device 40. FIG. 2 shows a display section 60 of the display device 50. As shown in FIG. 2, the display section 60 is provided with a mode setting portion 62 used for selecting the mode, a directory displaying portion 64 for displaying the name of parameter directories described later, a command displaying portion 66 used for designating one operation among creating a directory, renaming a directory and deleting a directory, an executing command button 68 used for designating actuation of the application program 30, and a termination command button 70 used for terminating the operation of the environment setting system 20.

The user operates the input device 40, which may be a pointing device, to designate the button 62-1 in the mode setting portion 62. The operating system 10 informs the directory management section 22 that the button 62-1 has been selected, whereby the directory management section 22 starts to operate in the environment creation mode. In the environment creation mode, a parameter directory used to store parameters for determining the environment of the application program 30 is created. In this embodiment, as shown in FIG. 1, the operating system 10 includes a directory hierarchy 100 having a tree structure with a plurality of directories used in the environment setting system 20. As a matter of course, the operating system may further include other directory hierarchies each having a tree structure with a plurality of directories. Consequently, the directory hierarchy 100 constitutes a part of a number of directory hierarchies included in the operating system 10. Further, the directory hierarchy 100 can be placed in any hierarchy among the directory hierarchies included in the operating system 10. In the highest level of the directory hierarchy 100 is provided a first level directory 101. A second level directory group 110 may be provided under the first level directory 101. Furthermore, a third level directory group 120 may be provided under each second level directory 110-1 to 110-n included in the second level directory group 110. The first level directory 101 is created in advance on the operating system 10. Consequently, directories included in the second and third level directory groups 110, 120 can be parameter directories used for setting the user's own environment.

The user refers to the display section 60 of the display device 50 and using the input device 40, inputs a name for the parameter directory and the level of the directory. The operating system 10 transfers this information to the directory management section 22. The directory management section 22 creates a parameter directory having the designated directory name in the designated level.

For instance, if the user intends to create a second level directory 110-1 named "group" in the level under the first level directory 101, he or she selects the MAKE command button 66-1 in the command display portion 66 of the display section 60 shown in FIG. 2 and inputs the directory name "group" using the input device 40 such as the keyboard and pointing device. As described above, since the information input by the user is transferred to the directory management section 22 by the operating system 10, a second level directory 110-1 having the name of "group" is created in the level under the first level directory 101.

Figure 3:
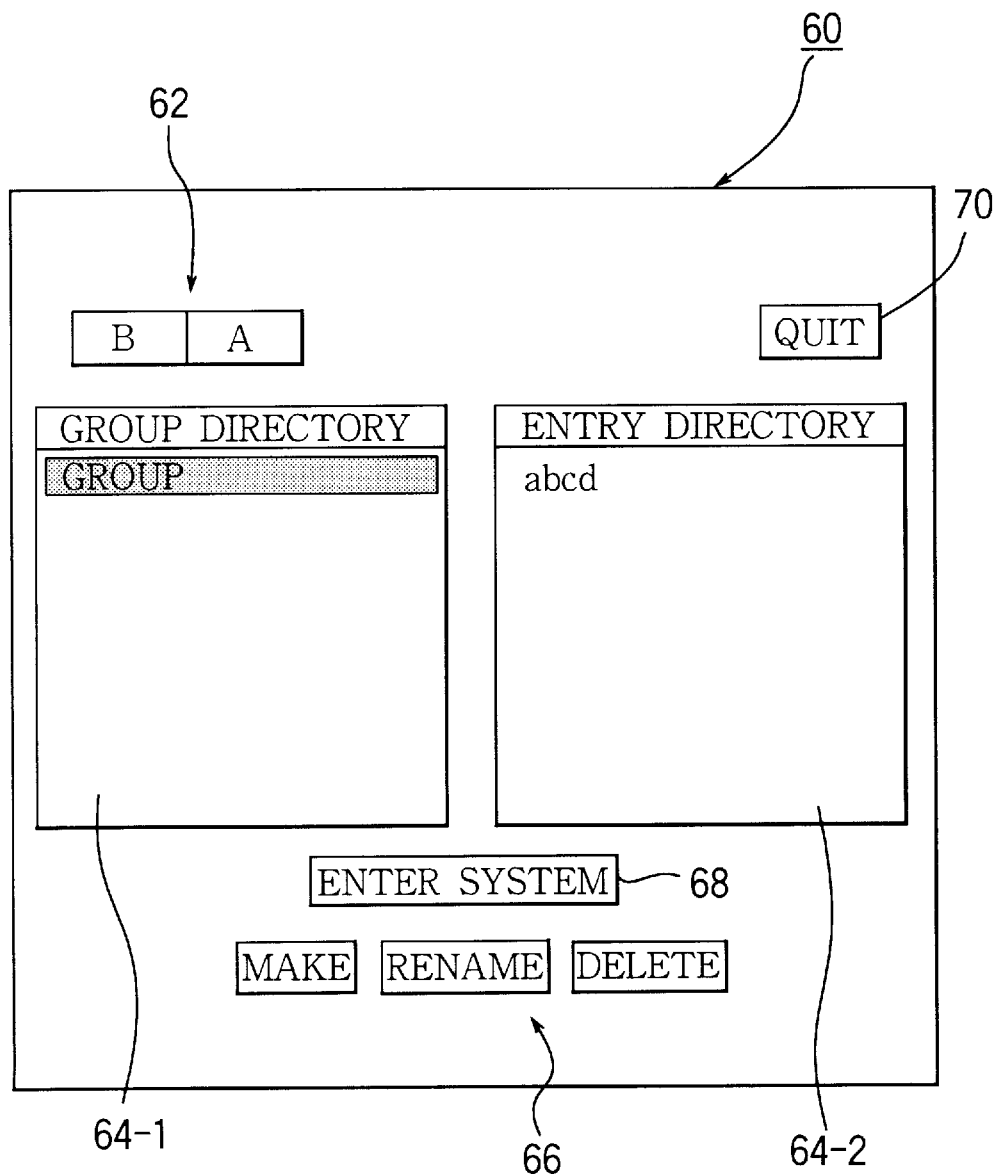
FIG. 3 is a view showing an image displayed on a display section of a display device.

Next, if the user wants to create a directory with the name "abcd" in the level under the second level directory 110-1 with the name "group" included in the second level directory group 110, he or she selects the MAKE command button 66-1 in the command button 66 of the display section 60 shown in FIG. 2 and inputs the directory name "abcd" using the input device 40. Similarly to the above, the information input by the user is transferred to the directory management section 22 by the operating system 10 and a third level directory 120-0 named "abcd" is created in the level under the second level directory 110-1. As shown in FIG. 3, the name of the parameter directory included in the thus created second level group 110 and the name of the parameter directory included in the third level group 120 are displayed in the directory display portions 64-1 and 64-2 of the display section 60 respectively.

Further, if the user wants to rename a once created parameter directory, he or she selects the RENAME command button 66-2 in the command display portion 66 and inputs the new name for the directory using the input device 40. Similarly, if the user wants to delete the parameter directory, he or she selects a DELETE command button 66-3 in the command display portion 66 and inputs the name of the directory to be deleted using the input device 40. Similarly to the case of creating a parameter directory, the information input by the user is transferred to the directory management section 22 by the operating system 10 and the name of the parameter directory designated by the information is renamed or the parameter directory is deleted.

Then, if the thus created parameter directory is included in the third level group 120, the directory management section 22 creates in the parameter directory a parameter file for storing parameters for determining the environment of the application program 30. The user operates the input device 40 to input data concerning the environment to be implemented when the application program 30 is used. These include, for example, the display format for the file list of the files used by the application program 30, read-write attributes, and the gray level of image data to be displayed on the display device 50 as an image.

The environment of the application program 30 set by the user is transferred to the parameter management section 24 by the operating system 10. The parameter management section 24 creates the desired environment parameters in accordance with the received environment data and stores them in the predetermined area of the parameter file in the parameter directory.

For example, if, as described above, the third level directory 120-0 has been created by the directory management section 22, the parameter management section 24 stores the environment parameters created based on the environment set by the user in a parameter file 122-0 created by the directory management section 22.

Owing to the operations of the user and the environment setting system 20, it is possible for the user to utilize the application program under his or her own environment in a designating mode described later by designating the parameter directory which includes the parameter file storing the data concerning his or her own environment.

In addition, the user can create a parameter directory in the directory hierarchy 100 having a tree structure with multiple directories. For example, each of the second level directories 110-1 to 110-2 can be created to have a name corresponding to a user's name and the third level directories 120-0 to 120-*m* under each second level directory 110-1 to 110-*n* can be created to include parameter files storing data concerning the environment used when a certain user utilizes the application program 30. Therefore, each user can set a plurality of environments each matched to a way of utilizing the application program 30.

The designating mode in which the application program 30 is operated under the user's own environment will now be explained.

The user operates the input device 40 such as the pointing device and selects button 62-2 in the mode setting portion 62. The operating system 10 informs the directory management section 22 that the button 62-2 has been selected, whereby the directory management section 22 starts to operate under the designating mode.

Then, the user inputs the name of the parameter directory which includes the parameter file storing the user's environment parameters. The directory name input by the user is transferred to the directory management section 22 by the operating system 10. The directory management section 22 designates the parameter directory corresponding to the directory name. For instance, if the parameter file 122-1 shown in FIG. 1 which is included in the third level directory 120-1 stores the data concerning the user's environment, the user operates the input device 40 and inputs the name of the third level directory 120-1, whereby the third level directory 120-1 is designated.

After the designation of the parameter directory, the user operates the input device 40 such as pointing device, and selects the executing command button 68 of the display portion shown in FIG. 2. Information indicating that the executing command button 68 has been selected is transferred to the directory management section 22 by the operating system 10, whereby the directory management section 22 executes the application program 30. At this time, the parameter management section 24 reads out the environment parameters from the parameter file which is included in the parameter directory designated by the directory management section 22 and transfers the environment parameters utilized by the user to the application program 30. If the values of the environment parameters transferred by the parameter management section 24 differ from any default values of the environment parameters stored in the parameter file in advance, the application program 30 runs under the environment based on the transferred environment parameters.

As described above, the user can utilize the application program 30 under his or her own environment.

It may be necessary for the user to modify his or her environment during the use of the application program 30. Accordingly, as the environment is modified based on the user's instruction, the parameter management section 24 reads out the environment parameters from the application program 30 and saves them in the parameter file in the parameter directory which was input by the user and designated by the directory management section 22 before the application program 30 is used. For example, as shown in FIG. 1, if the third level directory 120-1 is designated as the parameter directory by the directory management section 22, the parameter management section 24 stores the environment parameters obtained from the application program 30 in a predetermined area of the parameter file 122-1 in the third level directory 120-1.

According to the above described embodiment, in the environment creating mode, a parameter directory is created for storing the environment parameters for determining the user's own environment and, in certain cases, a parameter file is created in the parameter directory for storing the environment parameters. In the designating mode, the parameter management section 24 obtains the environment parameters from the parameter file in the parameter directory, transfers them to the application program 30, and during the use of the application program 30, obtains the environment parameters from the application program 30 to store them to a predetermined parameter file. Consequently, the user can set his or her own environment for the application program 30 and use the application program 30 under the thus set environment.

The present invention has thus been shown and described with reference to specific embodiments. However, it should be noted that the present invention in no way limited to the details of the described arrangements but changes and modifications may be made without departing from the scope of the appended claims.

For example, in the above described embodiment, the parameter files can be created only in the third level directories 120-0 to 120-*m* included in the third level group 120 and the second level directory group 110 is constituted as a root directory used for creating the third level directories 120-0 to 120-*m*. However, it is possible to create parameter files in the second level directories 110-1 to 110-*n* included in the second level group 110. In this case, the parameter file created in each of the second level directories 110-1 to 110-*n* stores the environment parameters common to all environment parameters stored in the third level directories 120-0 to 120-*m* provided under each of the second level directories 110-1 to 110-*n*.

Further, in the above described embodiment, although the parameter file is created by the directory management section 22, when the third level directories 120-0 to 120-*m* included in the third level directory group 120 is created, the directory management section 22 may be constituted such that it does not create the parameter file if the user can utilize the environment data stored in the application program 30 in advance, namely, the environment data of default values.

Furthermore, in the case where each of the user accounts on the operating system 10 correspond to user accounts on the application program 30, each of the third level directories 120-0 to 120-m included in the third level directory group 120 can be used as a user account on the application program 30, whereby the individual user accounts on the application program 30 can be used for storing printer accounts or the like for specific users.

Moreover, in the present invention, the respective means need not necessarily be physical means and arrangements whereby the function of the respective means is accomplished by software fall within the scope of the present invention. In addition, the function of a single means may be accomplished by two or more physical means and the functions of two or more means may be accomplished by a single physical means.

According to the present invention, it is possible to provide an environment setting system in which users can themselves set their own application program environments without the help from a system administrator, and can use the application program under the thus set environments.

I claim:

1. An environment setting system for multiple users, in which said users can set their own user specified default parameters for an application program which has its own predetermined default parameters, comprising:

directory management means, adapted to be executed by a predetermined command on an operating system, for generating a parameter directory which is independently designated by said user and used for storing said user specified default parameters, said user specific default parameters determining an environment of said application program utilized by said user; and parameter management means for fetching said user specified default parameter present in said parameter directory, transferring said user specified default parameter to said application program and storing said user specified default parameter in said parameter directory.

2. An environment setting system in accordance with claim 1, wherein said directory management means is adapted to create a parameter file included in said parameter directory after the creation of the parameter directory, and wherein said parameter management means is adapted to store said user specified default parameter in said parameter file.

3. An environment setting system in accordance with claim 2, wherein said parameter directory is constituted as a part of a hierarchical structure having a plurality of hierarchies on the operating system.

4. An environment setting system in accordance with claim 2, wherein said parameter files contain only said user specified default parameters.

5. An environment setting system in accordance with claim 2, wherein there are a plurality of said parameter directories and said parameter files for each user to apply various different sets of said user specified default parameters to said application program.

6. An environment setting system in accordance with claim 3, wherein said parameter file is created only in said parameter directory in a lowest level of said hierarchical structure.

7. An environment setting system in accordance with claim 1, wherein said parameter directory is constituted as a part of a structure having a plurality of hierarchies on the operating system.

8. An environment setting system in accordance with claim 7, wherein said parameter file is created only in said parameter directory in a lowest level of said hierarchical structure.

9. An environment setting system in accordance with claim 1, wherein said parameter management means is constituted so that as said user specified default parameters are modified, during the use of said application program, said parameter management means stores the thus modified parameters in said parameter directory.

10. An environment setting system in accordance with claim 1, wherein said directory management means is adapted to designate a certain directory as said parameter directory to be used for storing and retrieving said user specified default parameter.

11. An environment setting system as provided in claim 1, wherein said system enables user designation of said environment parameter directory and user control of said user specified default parameters on a single user operating system and a multi-user operating system.

12. An environment setting system for multiple users, in which said users can set their own user specified default parameters for an application program which has its own predetermined default parameters, comprising:

environment directory management means for generating an environment parameter directory used for storing said user specified default parameter which determines an environment of an application program utilized by said user; and environment parameter management means for fetching said user specified default parameter present in said environment parameter directory and replacing said predetermined default environment parameter of said application program with said user specified default parameter when said user loads said application program, and storing said user specified default parameter in said environment parameter directory, so that said user can designate said environment parameter directory and repeatedly use and revise their own application program environment settings without authorization or intervention of a system administrator.

13. An environment setting system in accordance with claim 12, wherein said environment directory management means is adapted to create an environment parameter file included in said environment parameter directory after the creation of said environment parameter directory, and wherein said environment parameter management means is adapted to store said user specified default parameter in said environment parameter file.

14. An environment setting system in accordance with claim 13, wherein said environment parameter directory is constituted as a part of a structure having a plurality of directory hierarchies in a operating system.

15. An environment setting system in accordance with claim 14, wherein said environment parameter management means is constituted so that as various stored said user specified default parameters are modified by said user, during the use of said application program, said environment parameter management means stores the thus modified user specified default parameters in said environment parameter directory.

16. An environment setting system in accordance with claim 12, wherein said environment directory management means is adapted to designate a directory as said environment parameter directory to be used for storing and retrieving said user specified default environment parameter.

17. A method for setting application program default parameters to user specified default parameters, comprising the steps of:

providing an application program with default environment parameters;

designating a directory as an environment parameter directory, said environment parameter directory independently designated by said user without prior authorization or intervention of a system administrator;

selecting said user specified default parameters different than said default environment parameters in accordance with user selected input;

storing said user specified default parameters to said environment parameter directory; and modifying said application program's default environment parameters to be the same as said user specified default parameters stored in said environment parameter file, when said user loads said application program, so as to create said application program having said user specified default parameters.

18. The method for setting application program default parameters in accordance with claim 17, further comprising the step of:

updating said user specified default parameters to reflect user changes to environment parameters during operation of said application program.

19. The method for setting application program default parameters in accordance with claim 18, wherein said method enables user designation of said environment parameter directory and user control of said user specified default parameters on a single user operating system and a multi-user operating system.

* * * * *